United States Patent [19]

Pauwels

[11] Patent Number: 4,859,330
[45] Date of Patent: Aug. 22, 1989

[54] TRAVELING BRIDGE FILTER WITH AIR SCOUR

[75] Inventor: Julian R. Pauwels, Thomasville, Ga.

[73] Assignee: Davis Water & Waste Industries, Inc., Thomasville, Ga.

[21] Appl. No.: 255,612

[22] Filed: Oct. 11, 1988

[51] Int. Cl.$^4$ ................... B01D 23/16; B01D 23/24
[52] U.S. Cl. ................... 210/264; 210/273; 210/274; 210/275; 210/279; 210/290
[58] Field of Search ............... 210/143, 264, 269, 271, 210/273, 274, 275, 277, 279, 290, 793, 794

[56] References Cited

U.S. PATENT DOCUMENTS

| | | | | |
|---|---|---|---|---|
| Re. 12,488 | 5/1906 | Blaisdell | ............... | 114/170 |
| 471,811 | 3/1892 | Deutsch | ............... | 210/279 |
| 649,409 | 5/1900 | Jewell | ............... | 210/270 |
| 1,383,384 | 7/1921 | Brown | ............... | 210/276 |
| 1,617,654 | 3/1927 | Sivade | ............... | 210/273 |
| 2,194,071 | 3/1940 | Hine | ............... | 210/793 |
| 2,235,227 | 3/1941 | Lose, Jr. | ............... | 210/795 |
| 2,302,449 | 11/1942 | Laughlin | ............... | 210/273 |
| 2,302,450 | 11/1942 | Laughlin | ............... | 210/264 |
| 2,335,749 | 11/1943 | Fraser | ............... | 210/796 |
| 3,984,326 | 10/1976 | Bendel | ............... | 210/264 |
| 4,133,766 | 1/1979 | Adie | ............... | 210/275 |
| 4,152,265 | 5/1979 | Meyers | ............... | 210/273 |
| 4,211,656 | 7/1980 | Cochrane | ............... | 210/149 |
| 4,308,141 | 12/1981 | Clendenen | ............... | 210/264 |
| 4,450,077 | 5/1984 | Black et al. | ............... | 210/275 |
| 4,454,034 | 6/1984 | Astrom et al. | ............... | 210/108 |
| 4,486,307 | 12/1984 | Weiler | ............... | 210/275 |
| 4,540,487 | 9/1985 | Johnson et al. | ............... | 210/264 |
| 4,624,783 | 11/1986 | Black et al. | ............... | 210/271 |

Primary Examiner—W. Gary Jones
Assistant Examiner—Matthew Savage
Attorney, Agent, or Firm—Nixon & Vanderhye

[57] ABSTRACT

A liquid filtration system is provided which includes a traveling bridge device mounting air scour and backwash means for successively cleaning each of a plurality of filter cells formed in a filtration tank. The air scour means includes a first hood open to atmosphere and adapted for sealing engagement with each filter cell. The first hood may include an air scour inlet conduit for supplying air under pressure to each cell. The backwash means includes a second hood also adapted for sealing engagement with each filter cell and includes a backwash conduit for creating suction within each filter cell. In one embodiment where the air scour pump is mounted on the traveling bridge carriage, each cell is provided with a vertical riser adapted for sealing engagement with the air scour inlet conduit in the air scour hood. In an alternative arrangement, the air is supplied from a ground installed pump, through a common inlet manifold, to the individual cells. In this embodiment, the air flow is regulated by valves located externally of each cell, and successively actuated by a control arm mounted on the carriage.

25 Claims, 5 Drawing Sheets

TRAVELING BRIDGE FILTER WITH AIR SCOUR

BACKGROUND AND SUMMARY OF THE INVENTION

This invention relates generally to liquid filtration systems and, more specifically, to traveling bridge-type cleaning devices for sequentially cleaning a plurality of downward flow, suspended solids filter units.

It is well known in the art to utilize filtration tanks divided into a plurality of filter cells, one adjacent the other, and all containing a multi-layer or single layer arrangement of granular filter media such as sand, gravel and the like. In downward flow filtration systems of this type, water or other liquid containing suspended solid particles is introduced into the filtration tank from above and clarified water is drawn off from a chamber beneath the filter cells. During downward flow through the individual cells, particulate matter is entrapped within the layers of granular filter media. Eventually, the particulate matter clogs the filter media, thereby reducing the filtering capability of the system. Thus, there is a need for periodic cleaning of the filter cells. It is also known to maintain such units in continuous operation during cleaning by the use of traveling bridge devices which move from one filter cell to the next, to clean individual cells while permitting the filtration process to continue in the remaining cells.

Examples of traveling bridge apparatus of this type may be seen in U.S. Pat. Nos. 4,540,487; 4,486,307; 4,133,766; 3,984,326; 2,235,227, and 649,409. Typically, traveling bridge systems include an overhead carriage, movable along tracks, guideways or the like, which carries, e.g., a backwash hood successively engageable with the upper end of each filter cell. For a downflow type filter, water or other treatment liquid is generally introduced into the cell from below, in a counterflow arrangement to the normal filtering direction. The backwash hood typically includes a suction head for drawing out fluid and debris forced to the surface of the filter cell as a result of the backwash. As the backwash of individual cells are completed, the traveling bridge will index the backwash hood to the next adjacent cell. See, for example, U.S. Pat. No. 4,308,141, in which a modular filter system is disclosed, and wherein a traveling bridge type backwash system is indexed to successive filter units.

In the present invention, a unique combination of filter cell cleaning devices are provided in a traveling bridge configuration. Specifically, a dual hood assembly is provided wherein an air scour operation precedes a backwash operation during the successive cleaning of each individual cell.

In one exemplary embodiment, an elongated, rectangular filtration tank is divided into a plurality of individual cells by a plurality of laterally spaced, substantially parallel partitions extending across the width of the tank. The tank is further provided with tracks or guideways supporting a traveling bridge for movement along the top of the tank, in a direction transverse to the orientation of the upright partitions. The traveling bridge includes a carriage which carries air scour means as well as backwash means, arranged for sequential engagement with each filter cell.

The air scour means includes an air scour hood having a pair of vertical walls longitudinally spaced apart a distance corresponding to the width of the individual filter cell partitions. The air scour hood is provided with sealing means, such as rubber gaskets, at the lower end of each of the vertical walls, which engage the upper surfaces of the cell partition walls, thereby isolating the cell from the remaining cells. The air scour hood is open to atmosphere at its upper end, and is connected to an air scour supply conduit extending between the hood and the carriage. The air scour supply conduit is connected at its upper end to a pump or other source of pressurized air mounted on the carriage. The lower end of the air scour outlet conduit is provided with a flanged head or boot adapted to successively engage vertical risers extending upwardly from the lower end of each cell to the upper end thereof, approximately mid-way along the length of the cell. In this first exemplary embodiment, a horizontal air supply conduit is connected to the lower end of each vertical riser and extends across the lower half of each filter cell, preferably in the lower portion of an intermediate layer of filter media, and in a direction substantially parallel to the cell partitions. Each such horizontal conduit is provided with a plurality of perforations along its length and about its periphery so that, when air is supplied to the filter cell it will be uniformly discharged along the cell, preferably within the intermediate layer of filter media. As the air flows upwardly through the filter media, it dislodges particulate matter which will be ultimately backwashed in the next successive step. The air utilized in the air scour step is eventually vented to atmosphere through the open top of the air scour hood.

Also mounted on the traveling bridge carriage is a conventional backwashing device including a backwash hood and a horizontal backwash suction conduit. The backwash hood comprises conical, upwardly inclined side walls which terminate, at their lower ends, with sealing means such as rubber gaskets which engage the cell partitions to isolate the respective cells from the remaining cells. Preferably, one of the conical side walls merges with one of the air scour hood walls so that one of the sealing means is common to both hoods. In other words, the dual hood assembly need only employ three sealing devices to isolate two adjacent filter cells.

The horizontal backwash suction conduit is located within the hood section per se, and is connected substantially midway along its length to a vertical suction conduit extending upwardly, through the hood, to the carriage. The carriage also mounts a suction pump, the outlet side being connected to the vertical suction conduit. Like the horizontal air supply conduits, the horizontal backwash conduit has a length substantially equal to the length of the individual cells. The suction conduit is also provided with a plurality of uniformly arranged apertures extending along its length and about its periphery to uniformly draw liquid and accompanying debris out of the filter cell in a direction opposite the normal filter flow direction to thoroughly backwash the filter media.

The combination of an air scour/backwash operation, carried out successively for each filter cell, quickly and effectively cleans each filter cell without disturbing the overall operation of the liquid filtration system.

It will be appreciated that in order to index the dual hood assembly to successive cells along the filtration tank, the assembly is reciprocable vertically by a distance sufficient to enable the dual hood structures to disengage from the cell partitions or walls, and to clear the adjacent cell partitions during lateral movement to the next cell. To this end, a portions of the vertical air scour conduit and vertical backwash conduit, respectively, may be provided with flexible, e.g., bellows-type connectors which permit a relatively small degree of vertical movement of the dual hood structures vis-a-vis the vertically fixed carriage.

In a related aspect of the invention, the vertical air scour riser provided in each filter cell is fitted with a spring loaded valve at its upper end, the valve opening in response to air pressure supplied through the air scour supply conduit when the riser and supply conduit are in engagement. It is also a feature of this invention that the air scour supply conduit boot mount a squeegee-type device to remove debris from the upper surface of the valve. In an alternative mode, the squeegee-type device may be eliminated and the air scour pump can be actuated just prior to engagement of the air supply conduit and the riser valve to supply a burst of air which will clean the valve head.

In an alternative embodiment of the invention, the air scour pump is located on the ground, and each individual cell unit is provided with a horizontal air scour conduit which extends along the length of each cell and out of the side wall of the tank where each of the air scour inlet conduits is joined to a common manifold extending from an air supply source. A manually operable valve is provided in each of the inlet conduits adjacent the side of the tank and aligned along a longitudinally directed guide rail. At the same time, the traveling bridge is provided with a valve actuator which includes an automatically rotatable device which is designed to engage the manually operable valve and, in accordance with an automatic programmable control sequence, open the valve to initiate the air scour operation, and thereafter close the valve when the operation is completed. In this second embodiment, the overhead carriage continues to mount the backwash hood and backwash pump, as well as the air scour hood.

Accordingly, in its broadest aspect, the present invention relates to a traveling bridge filter cleaning system including a liquid filtration tank divided into a plurality of adjacent filter cells, each of the cells containing filter media, a traveling bridge carriage located above the tank and movable along the tank, the carriage mounting air scour means comprising an air scour hood adapted to sealingly engage each of said cells, and backwash means comprising a backwash hood also adapted to sealingly engage an adjacent one of the cells.

It will therefore be appreciated that the present invention provides a unique combination of air scour and backwash means in a traveling bridge filter cleaning system which effectively cleans successive cells of a multi-cell tank without disturbing the filtering process in the remaining cells.

Additional objects and advantages of the subject invention will become apparent from the detailed description which follows.

DETAILED DESCRIPTION OF THE DRAWINGS

Figure 1:
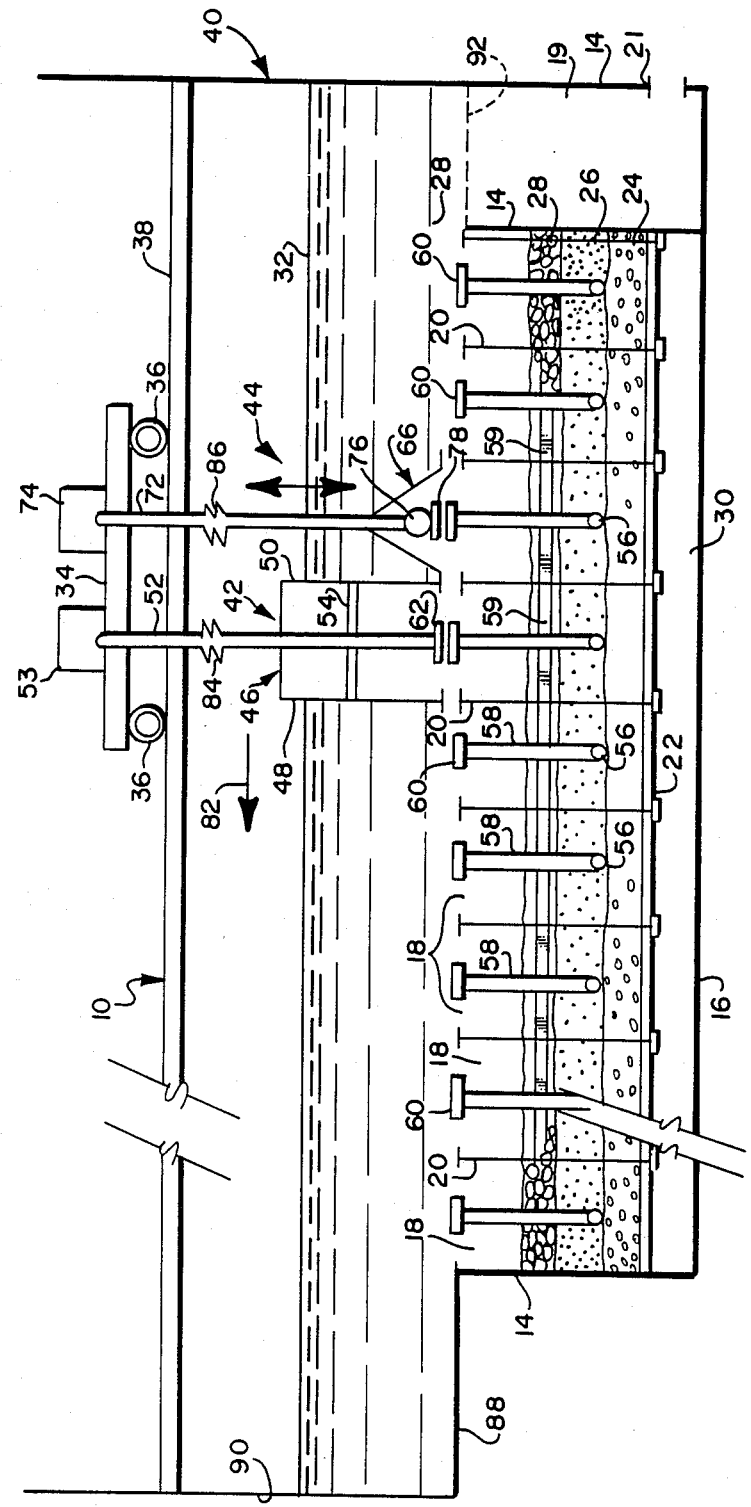
FIG. 1 is a partially schematic side view of a traveling bridge type filtration system in accordance with the invention.
Figure 2:
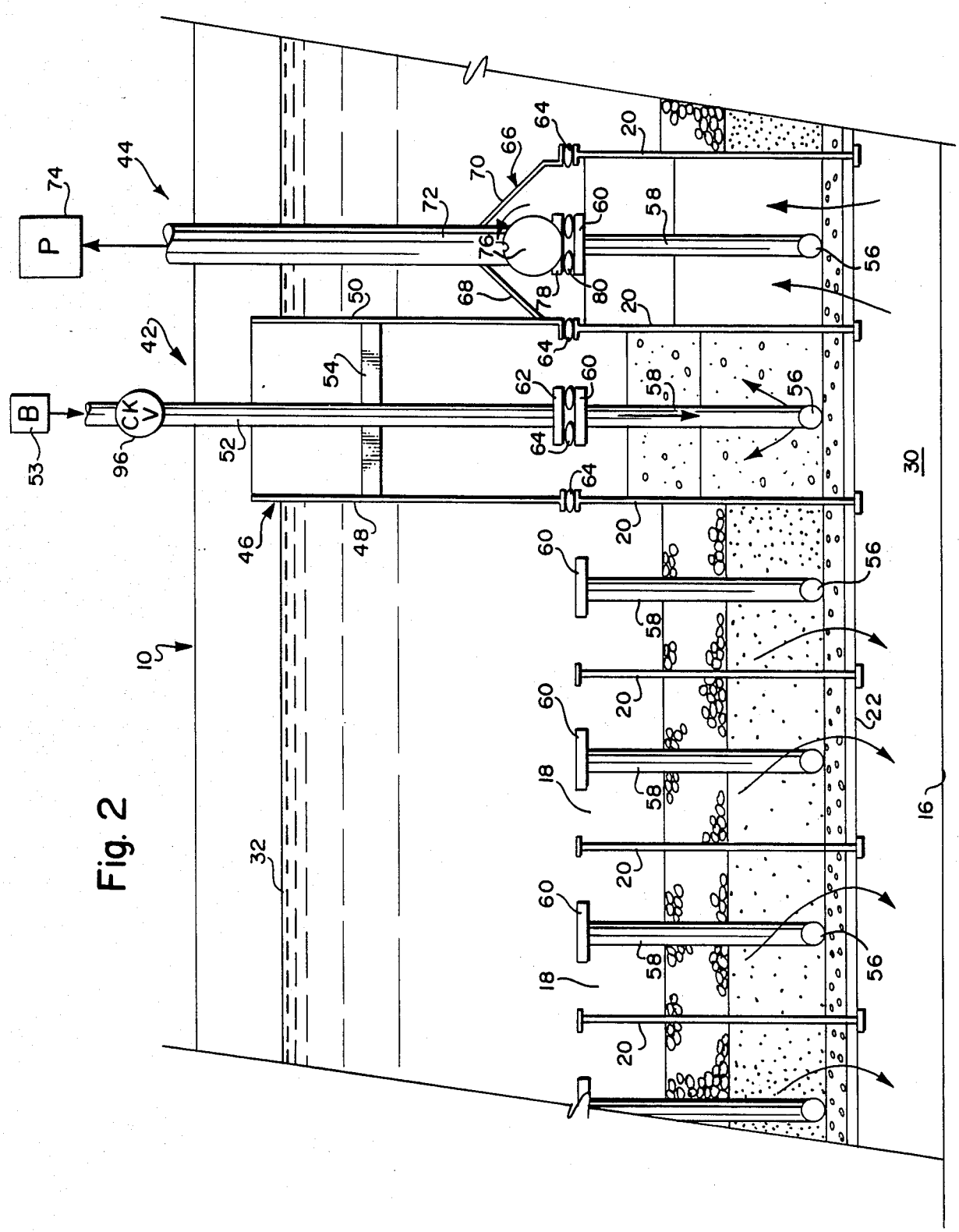
FIG. 2 is a partial side view of the air scour and backwash dual hood structure shown in sealed relationship with a pair of adjacent cells in accordance with an exemplary embodiment of the invention.
Figure 3:
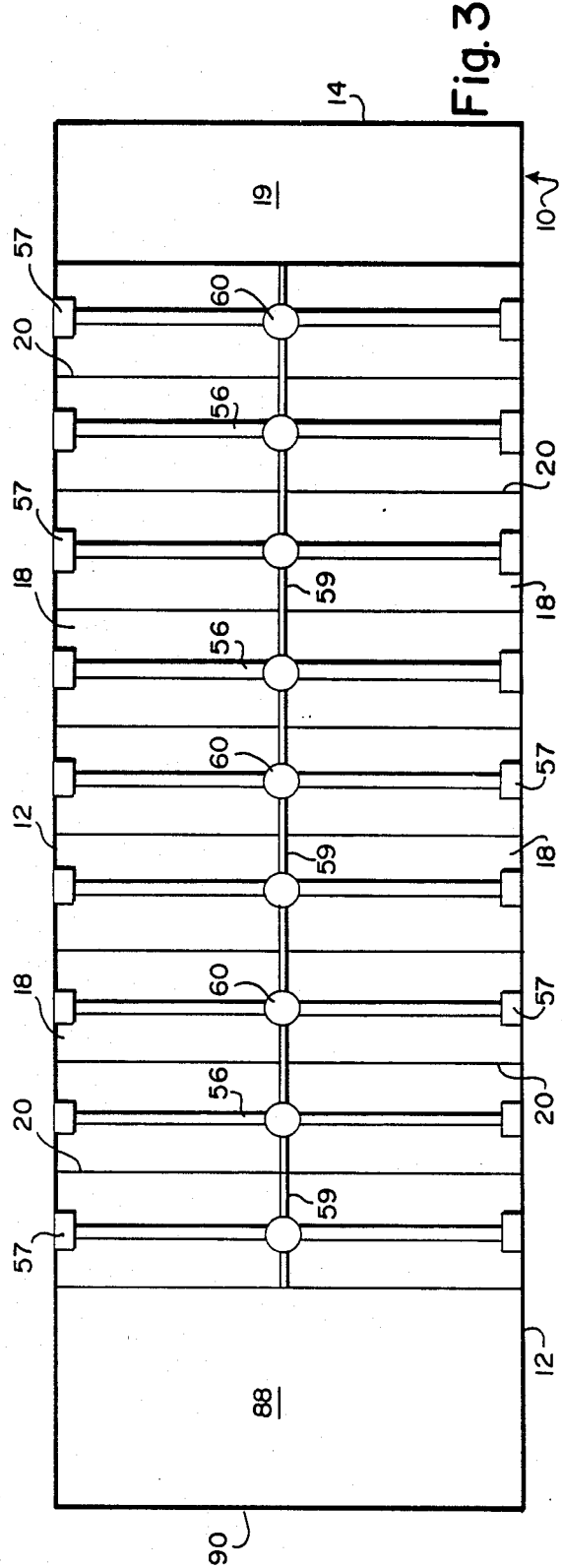
FIG. 3 is a top view of a filtration tank in accordance with an exemplary embodiment of the invention with the traveling bridge removed.

Referring now to FIGS. 1-3, a suspended solids filtration apparatus in accordance with this invention includes a substantially rectangular tank 10 comprising side walls 12, end walls 14 and a bottom wall 16. The tank is divided into a plurality of filter cells 18 by generally upright, spaced partitions 20 which extend from one side of the tank to the other, in a substantially parallel arrangement, and substantially transversely of the direction of elongation of the tank. It will be appreciated, however, that the shape of the tank and the orientation of the filter cell partitions may be varied in accordance with design requirements, etc. For example, for some applications, the end most filter cell (to the far right in FIG. 1) may comprise a skimming tank 19, which contains no filter media, and which contains an outlet 21 in a lower portion thereof.

The tank includes an underdrain or subfloor 22 resting on the partitions 20, and which supports a multilayer filter media bed comprising layers of gravel 24, sand 26 and anthracite 28. The space between bottom wall 16 and subfloor 22 comprises a chamber 30 from which filtered water is drawn by suitable drain or pump means (not shown). Under normal circumstances, the water or other fluid to be treated is supplied to the tank at a level above the filter media by any suitable means (not shown) and the tank is filled to a maximum level 32.

In accordance with one exemplary embodiment of this invention, air scour and backwash means are movably supported on a traveling bridge which includes a carriage 34 provided with a plurality of wheels 36 which are guided along tracks or guideways 38 on an upper extension 40 of the tank. It will be appreciated that the tracks or guideways may also be part of an overhead framework or the like, separate from the tank construction. Further, in this regard, it is to be noted that the carriage and controls for indexing the carriage are not part of this invention, and may be of any conventional construction.

The carriage 34 supports an air scour device 42 and a backwash device 44 in suspended relationship vis-a-vis the carriage. As more clearly illustrated in FIG. 2, the air scour device includes a hood 46 comprising elongated wall panels 48,50 which are spaced apart by a distance substantially equal to the space between the upright partitions 20. In an exemplary embodiment of the invention, the lower portion of the hood is immersed in water or other liquid to be filtered, while the upper portion extends out of the water, and is therefore open to atmosphere.

A substantially vertical air scour inlet conduit 52 extends downwardly from an air supply blower 53 mounted on the carriage 34 and is fixed to walls 48, 50 by any suitable means such as braces 54.

At the same time, each filter cell is provided with a horizontally extending air inlet manifold or header 56 which extends generally parallel to, and adjacent partitions 20, and which extends substantially across the width of the tank. The manifold may be secured to the tank side walls 12 by mounting brackets 57 or by other suitable means.

Additional longitudinal bracing, such as shown at 59 in FIGS. 1 and 3, may be employed between the vertical risers 58 and adjacent cell walls 20 if desired. At a predetermined location along the length of the manifold or header 56, but preferably near or at the center thereof, there is connected a vertical riser 58 which extends upwardly to approximately the upper end of the cell partitions 20. Each riser 58 is provided with a flanged, and preferably annular head or boot 60. The flanged head or boots 60 are designed for periodic engagement with the similar annular boot 62 provided on the air scour inlet conduit 52.

As best seen in FIG. 2, walls 48, 50 as well as boot 62, are provided along their lowermost surfaces with sealing means such as rubber gaskets 64 which are secured thereto by any suitable means, enabling air and water tight seals to be established between the air scour hood 42 and individual filter cells 18, as well as between the air scour inlet conduit 52 and individual vertical riser 58.

The backwash device 44 includes a tapered backwash hood 66 which, like air scour hood 46, extends across substantially the full width of the tank 10. While the hood 66 may be substantially conventional in construction, in this invention, one side wall 68 of the hood is connected, (by welding, for example) to side wall 50 of the air scour hood 46. By this arrangement, only a single gasket 64 is required to effect sealing engagement with the cell partition located at the interface between the air scour hood 46 and backwash hood 66. The side wall 70 opposite side wall 68 is, of course, provided with its own seal or gasket 64.

A backwash suction conduit 72 extends from a suction pump 74 mounted on the carriage 34. The suction conduit 72 extends through the hood, approximately midway along the length of the hood, and is connected to a horizontal suction manifold 76 which extends generally parallel to the cell partitions 20 and substantially across the entire width of the tank. The manifold 76 is also provided with a plurality of perforations (not shown) which provide for substantially uniform suction within the hood 66 across the respective cell 18.

The manifold 76 is also provided with an annular boot 78 and an associated annular gasket 80 which serve to seal off the vertical risers 58 during a backwash operation in accordance with one exemplary embodiment, thus preventing debris and the like from entering the air scour conduits 56, 58.

It will be appreciated that in a cell cleaning operation in accordance with one exemplary embodiment, carriage 34 will successively index the air scour and backwash means to filter cells 18, in the direction of the arrow 82 in FIG. 1. At the same time, means must be provided to move the air scour hood 46 and backwash hood 66 vertically toward the cells 18. This movement is required to enable sealing engagement between the respective hoods 46, 66 and an adjacent pair of cells 18, as well as sealing engagement between boots 62 and 78, respectively, with associated boots 60 of the air scour inlet conduits 58. After cleaning, the air scour and backwash hoods are retracted vertically upwardly away from the cells a relatively small distance, e.g., on the order of two inches, to provide clearance which permits horizontal indexing to the next cell. The vertical reciprocatory movement may be effected by any conventional means (not shown), such as hydraulic cylinders, jacks, etc., along with conventional controls.

In order to permit relative movement between the air scour and backwash hoods and carriage 34, flexible couplings 84, 86 are interposed in conduits 52, 72, respectively. The couplings may be in the nature of a bellows or any other suitable flexing means. It will be understood further that since the air scour hood 46 is attached to the backwash hood 66, the two will move in concert.

In order to provide a rest position for the carriage 34 and associated air scour and backwash hoods, horizontal and vertical walls 88, 90, respectively, are provided to create an extended tank area which not only permits backwash of the last of the filter cells (to the left in FIG. 1), but also provides room for both air scour and backwash devices 42, 44. This provides a convenient at rest or park position at wall 88 for the traveling bridge when not in use, enabling unrestricted access from above to all of the filter cells.

In operation, after the carriage has been moved to one end of the tank, i.e., to the far right in FIG. 1, the air scour and backwash hoods are lowered into position, such that the air scour hood engages the partitions 20 of the first filter cell 18, and the backwash hood 66 is located over the skimming tank 19. Thus, the liquid in the skimming tank may be pumped out while the first filter cell is air scoured. After the air scour stage is completed as to the first cell 18, the dual hood assembly is retracted upwardly and moved laterally via carriage 34 to the next filter cell 18 and thereafter lowered into position so that the air scour hood 46 engages the second filter cell while the backwash hood 66 engages the first filter cell. After the initial air scour in the first cell, it will be appreciated that the air scour and backwash operations may be carried out simultaneously relative to successive filter cell pairs, as the carriage 34 is indexed right-to-left, until the last cell is reached at the far left side of the tank (FIG. 1), where a final backwash operation is carried out.

As the dual hood assembly is lowered into position over a subjacent filter cell pair, gaskets 64 on the air scour hood walls 48, 50, backwash hood wall 70 establish a hydraulic seal which isolates the pair of filter cells 18 from the remaining cells in the tank. Similar seals are created at the interfaces of boots 60, 62 and 60, 78, respectively.

During air scour, blower 53 supplies air at about 4 to 6 psi, regulated by a check valve 96 or other suitable means, to the horizontal manifold 56 via conduit 52, and riser 58. The air is discharged through the plurality of relatively small apertures in the manifold 56 for upward flow (indicated by arrows in FIG. 2) through the filter media. Suitable screening material may be used if desired to cover the perforations in the manifold 56 to prevent clogging of the perforations with dislodged debris, filter media, etc. The upward flow, countercurrent to the normal downward flow of the liquid to be treated, dislodges particulate matter within the filter media and initiates an upward flow of such matter, toward the upper portion of the cell. The air supplied to each cell is vented through the open top of the hood which extends above the liquid level 32. It will, of course, be appreciated that air scour hood walls 48, 50 also serve to prevent any lateral movement of particulate material into adjacent cells.

It will be appreciated that walls 48 and 50 need not extend, in parallel, above the liquid level 32 but may have a conical configuration similar to the backwash hood 66, so long as appropriate venting means, such as pipes, etc., are provided to vent the air to atmosphere.

During backwash, suction is created in the horizontal manifold 76 via pump 74, drawing water upwardly, countercurrent to the normal flow, through the filter media layers 24, 26, 28, hood 66, manifold 76 and backwash suction conduit 72, all the while cleansing the filter media and removing particulate matter initially dislodged in the air scour operation.

From pump 74, the backwash liquid is discharged through a hose to a trough or drain (not shown) in a conventional manner. During backwash, seal 80 prevents any debris or other particulate matter, including filter media, from entering the vertical riser 58 associated with the air scour operation.

In an alternative arrangement, the skimming tank 19 may not be required. In this case, a wall 92 (shown in phantom in FIG. 1) may be provided across the top of the space previously occupied by the skimming tank. In this embodiment, the air scour and backwash hoods 46, 66, respectively are reversed so that, with reference to FIG. 1, the backwash hood 66 would be closer to the left side of the tank and rest area 88. With this arrangement, carriage 34 begins air scour and backwash operations at the left side of the tank and indexes to each filter cell from left-to-right. At the far right side of the tank, wall 92 provides space for the air scour hood while the backwash hood engages the end most filter cell 18 on the right.

Figure 4A:
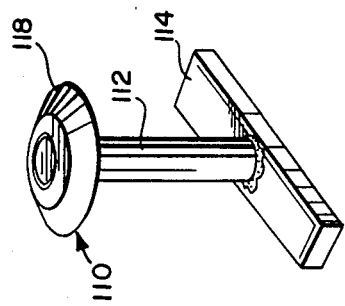
FIG. 4A is a perspective detail of the valve element illustrated in FIG. 4.
Figure 4:
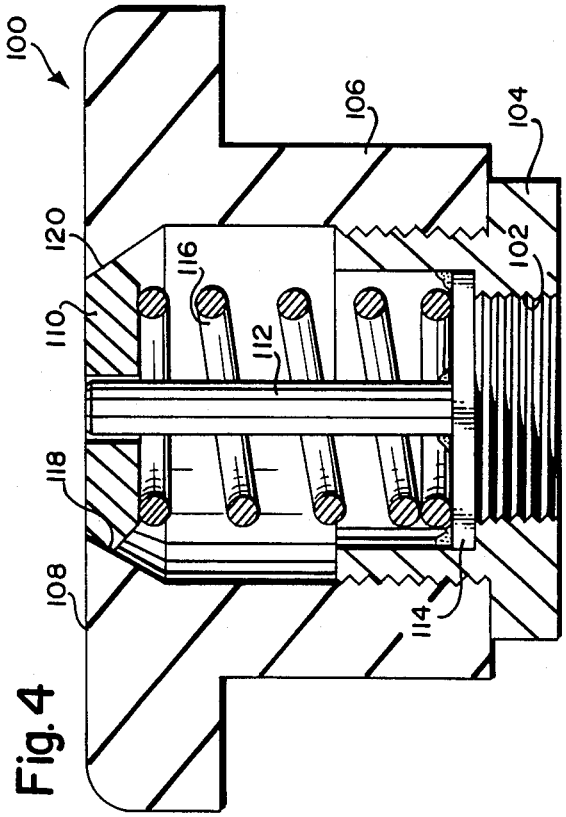
FIG. 4 is a side cross-sectional view of an air scour inlet valve in accordance with an alternative embodiment of the invention.
Figure 6:
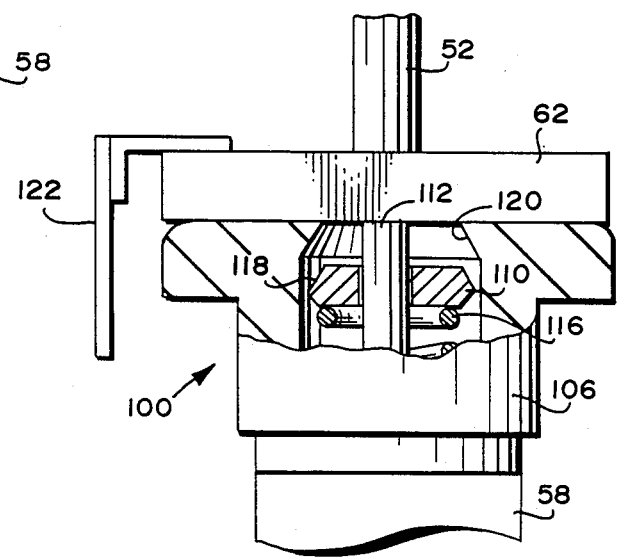
FIG. 6 is a detail as illustrated in FIG. 7 with the air scour inlet conduit and air scour valve in sealing engagement.

With reference to FIGS. 4 and 4A, the valve unit 100 is illustrated for use with the vertical risers 58 in an alternative exemplary embodiment of the invention. Specifically, a valve unit 100 may be threadably secured to each of the vertical risers 58 by means of a threaded connection as illustrated at 102 or by any other suitable means. A bushing 104 is threadably secured to the vertical riser and itself threadably receives an outer collar member 106. The outer collar 106 has a peripherally extending upper surface 108 which is adapted to engage the boot 62 at the lower end of the air scour inlet conduit 52. The valve unit 100 also includes a valve element 110 slidably received in a vertical stem 112 which, in turn, is mounted to a cross-member 114 welded within the bushing 104. The valve element 110 is biased into a normally closed position by a coil spring 116 or the like so that during non-use, dirt and debris cannot enter into the air supply conduits. During operation, when the air scour inlet conduit 52 and associated boot 62 is fully engaged with the upper surface 108 of the valve unit 100, the air supply blower 53 is actuated to supply air at a predetermined pressure of from about 4 to about 6 psi through the conduit 52. The air pressure acts on valve element 110, against the counter force exerted by spring 116 to unseat the valve element, and specifically the valve seat surface 118 from a corresponding and complementary surface 120 provided within the collar 106, as best seen in FIG. 6. It will be appreciated that when the supply of air under pressure is halted, by for example, completion of the air scour operation, the valve element 110 will automatically seat itself in the closed position under the influence of coil spring 116.

Figure 5:
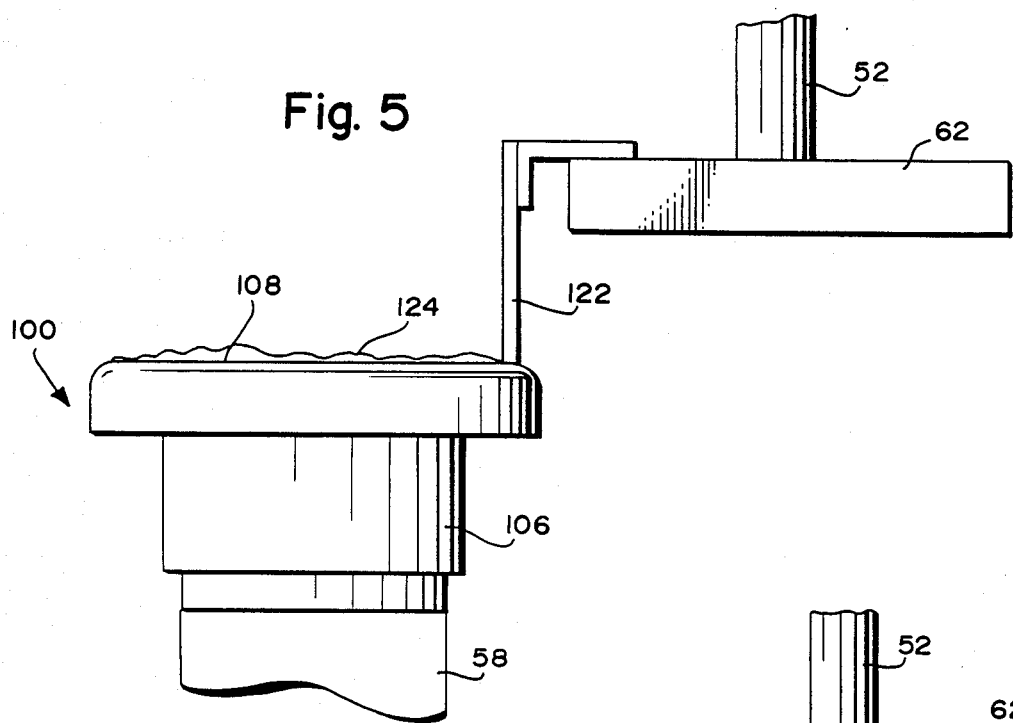
FIG. 5 is a detail of an air scour inlet conduit and air scour valve in accordance with another embodiment of the invention.

In another alternative feature of the invention, as shown in FIGS. 5 and 6, a squeegee-type element 122 may be mounted on air scour inlet conduit boot 62 so that, as the air scour inlet conduit laterally approaches the vertical riser 58, the squeegee element 122 scrapes along the upper surface 108 of the valve unit 100 to remove any debris 124 which may have accumulated on top of the valve. Thus, the valve surface is cleaned so that full surface engagement is assured between the boot 62 and valve 100 upon vertical downward movement, as shown in FIG. 6. It will be understood that although not required in FIGS. 5 and 6 embodiment, suitable seals such as rubber gaskets 64 may be used to further insure a good hydraulic seal between boot 62 and valve 100.

As an alternative to this arrangement the squeegee 122 may be eliminated and the air supply blower 53 may be actuated just prior to full surface engagement with the valve unit 100 to provide a burst of air which will remove any dirt and debris which has accumulated on top of the valve unit.

Figure 7:
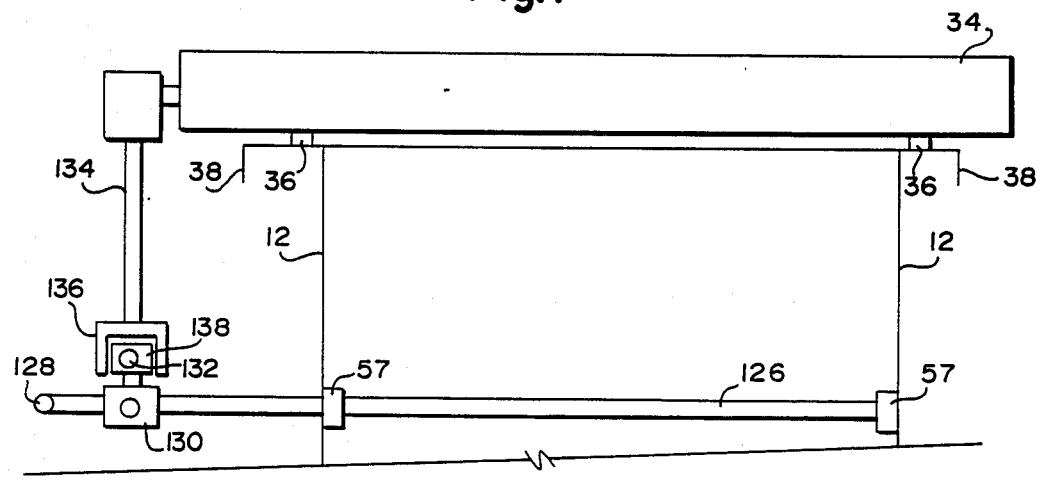
FIG. 7 is a schematic end view of a traveling bridge filtration system in accordance with an alternative embodiment of the invention.
Figure 8:
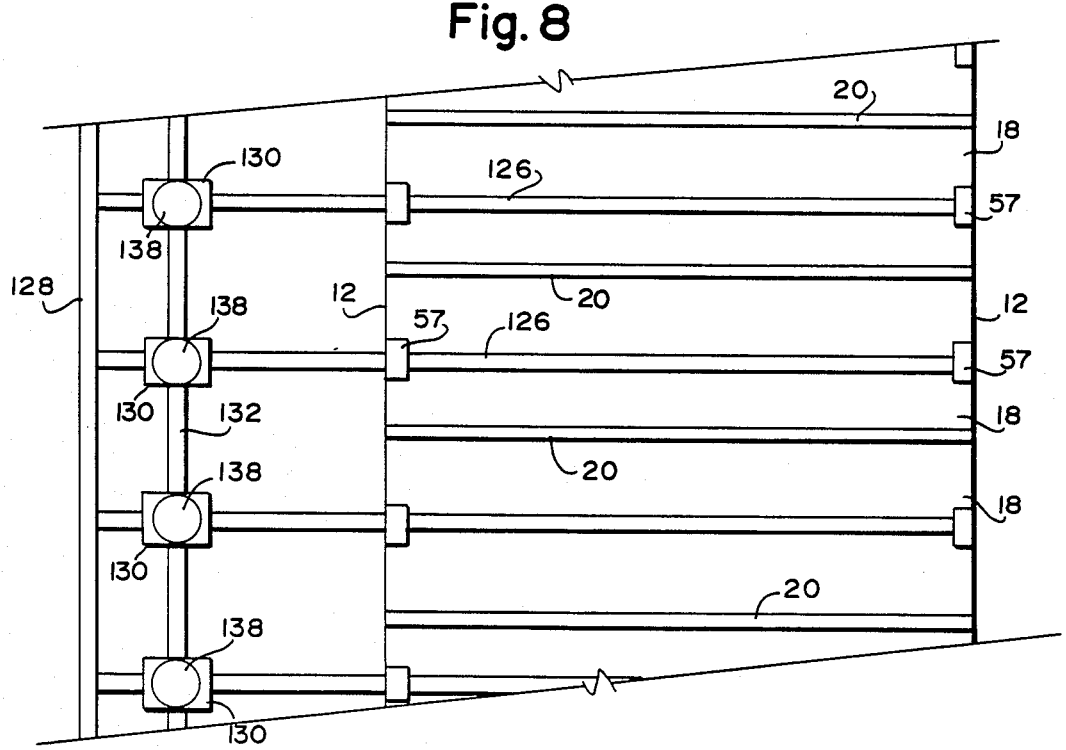
FIG. 8 is a partial top view of the filtration system illustrated in FIG. 5.

With reference now to FIGS. 7 an 8, still another exemplary embodiment of the invention is disclosed wherein each individual cell 18 is supplied with air for purposes of the air scour operation. In other words, in this embodiment, the vertical risers 58 are eliminated, and the carriage does not support the air scour blower 53, or the air scour inlet conduit 52.

More specifically, horizontal air scour manifolds 126, similar to manifolds 56, extend along each of the filter cells 18 but extend through the tank side wall 12 where they are joined to a common air supply inlet manifold 128. The manifold 128, in turn, is connected to a ground installed air scour blower (not shown) similar to blower 53. Between the tank 10 and the common manifold 128, each of the horizontally oriented air scour manifolds 126 is provided with a manually operable valve 130. Valve 130 may be of any conventional open/close design and is preferably of the type which may be rotated to open and closed positions. A guide rail 132 extends between the plurality of valves 130 to maintain operator 136 in alignment with valve 130 for purposes to be explained below.

With specific reference to FIG. 7, it may be seen that the overhead carriage 34 is provided with a vertically descending arm 134 extending downwardly therefrom and provided at its free end with a valve actuating member or socket 136. The valve actuating member or socket 136 may be rotated by suitable, automatic controls which, per se, do not form a part of this invention.

Arm 134 travels with the bridge 34, indexing to each cell following guide rail 132. When the bridge 34 stops at each cell, arm 134 and socket 136 engage a rotatable valve actuating knob 138 mounted atop the valve 130, and the socket is thereafter actuated to rotate the valve, e.g., one quarter turn, to an open position, permitting air under pressure to be supplied to the cell via conduit 126. The air flows upwardly through the cell and is thereafter vented through the air scour hood as previously described. Upon completion of the air scour operation, socket 136 is actuated to close the valve, and the arm 134 then travels with the bridge 34 along with the dual air scour and backwash hood assembly for indexing to the next cell.

The guide rail 132 insures accurate and stable alignment of socket 136 and valves 130 to insure proper engagement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a traveling bridge filter cleaning system including a liquid filtration tank divided into a plurality of adjacent filter cells, each of said cells containing filter media, a traveling bridge carriage located above said tank and movable along said tank, said carriage mounting air scour means comprising an air scour hood for sealingly engaging each of said cells, and backwash means comprising a backwash hood also for sealingly engaging each of said cells.

2. A traveling bridge filter cleaning system as defined in claim 1 wherein each of said cells is provided with an air scour manifold extending along substantially the entire length of the cell within a layer of filter media.

3. A traveling bridge filter cleaning system as defined in claim 2 wherein said air scour manifold includes at least one vertical riser adapted for sealing engagement with an air scour inlet conduit supported by said carriage.

4. A traveling bridge filter cleaning system as defined in claim 1 wherein said air scour hood comprises a pair of side walls, having upper ends and lower ends, the lower ends of said sidewalls provided with sealing means for sealingly engaging partitions in said tank which define said filter cells.

5. A traveling bridge filter cleaning system as defined in claim 1 wherein each of said cells is provided with at least three layers of filter media supported by a porous underdrain.

6. A traveling bridge filter cleaning system as defined in claim 5 wherein said air scour manifold of each cell is located within an intermediate layer of said at least three layers of filter media.

7. A traveling bridge filter cleaning system as defined in claim 1 wherein said backwash hood is located behind said air scour hood relative to the direction of travel of said bridge carriage.

8. A traveling bridge filter cleaning system as defined in claim 7 wherein said backwash hood is provided with a suction manifold extending along substantially the entire length of said backwash hood.

9. A traveling bridge filter cleaning system as defined in claim 8 wherein said carriage mounts an air scour pump for supplying air under pressure to each of said filter cells, and a backwash pump for creating suction within each of said filter cells.

10. A traveling bridge filter cleaning system as defined in claim 9 wherein each of said filter cells includes a substantially vertical riser connected to said air scour manifold, and wherein said riser is adapted for sealing engagement with an air scour inlet conduit connected to said air scour pumps.

11. A traveling bridge filter cleaning system as defined in claim 10 wherein said backwash hood includes cover means for closing the upper end of said vertical riser during filter cell backwash.

12. In a traveling bridge filter cleaning system for a waste water treatment tank containing a plurality of adjacent filter cells, the improvement wherein the traveling bridge is provided with air scour means and backwash means for simultaneous sealing engagement with adjacent pairs of said filter cells.

13. In a traveling bridge filter cleaning system as defined in claim 12 wherein said air scour means comprises a first hood open to atmosphere, said first hood further comprising means for supplying air, successively, to each of said cells.

14. In a traveling bridge filter cleaning system as defined in claim 13 wherein said backwash means includes a second hood adjacent said first hood, said second hood further comprising a backwash conduit connected to a vacuum source for creating suction, successively, within each of said cells.

15. A filtration system for removing suspended solids within a liquid comprising a tank divided into a plurality of individual filter cells, each cell defined by a pair of laterally spaced partitions extending across the tank, said tank including a subfloor supporting said partitions above a bottom wall of said tank; said subfloor also supporting a multi-layer filter media bed in each of said filter cells; a traveling bridge including a carriage movable along said tank and indexable to each of said filter cells; and wherein said carriage supports air scour and backwash means for engagement with successive pairs of said filter cells, such that one of said pair of filter cells may be air scoured while another of said pair of filter cells may be simultaneously backwashed.

16. A filtration system as defined in claim 15 wherein said filter cells are of the downward flow-type and wherein clarified liquid collects in a chamber located between said bottom wall and said subfloor.

17. A filtration system as defined in claim 15 wherein each of said filter cells is provided with a substantially horizontal air scour manifold, each manifold connected to a vertical riser extending substantially to an upper end of the cell.

18. A filtration system as defined in claim 17 wherein each vertical riser is provided with a spring loaded inlet valve.

19. A filtration system as defined in claim 18 wherein said air scour means includes an air scour inlet conduit adapted to engage said spring loaded inlet valve, and wherein said inlet valve is opened in response to air flow of predetermined pressure.

20. A filtration system as defined in claim 19 wherein means are provided to clean said spring loaded inlet valve prior to engagement with said air scour inlet conduit.

21. A filtration system as defined in claim 15 wherein each of said filter cells is provided with a substantially horizontal air scour manifold, each manifold extending through a side wall of the tank and connected to a common air supply inlet manifold.

22. A filtration system as defined in claim 21 wherein each of said horizontal air scour manifolds is provided with a rotary valve located externally of the tank, and wherein all of said valves are maintained in alignment.

23. A filtration system as defined in claim 22 and wherein said carriage includes means for successively actuating each of said valves.

24. A filtration system as defined in claim 15 wherein said tank is provided with means for guiding said carriage along said tank, and wherein said tank is provided with extended wall areas permitting said carriage to be moved beyond said filter cells, thereby permitting unrestricted access to said filter cells.

25. A filtration system as defined in claim 15 wherein said air scour means comprises a first hood open to atmosphere, and for sealingly engaging each of said filter cells, said first hood further comprising means for supplying air, successively, to each of said cells; and wherein said backwash means includes a second hood adjacent said first hood and for sealingly engaging each of said filter cells, said second hood further comprising a backwash conduit connected to a vacuum source for creating suction, successively, within each of said cells.

* * * * *